United States Patent Office 3,243,756
Patented Mar. 29, 1966

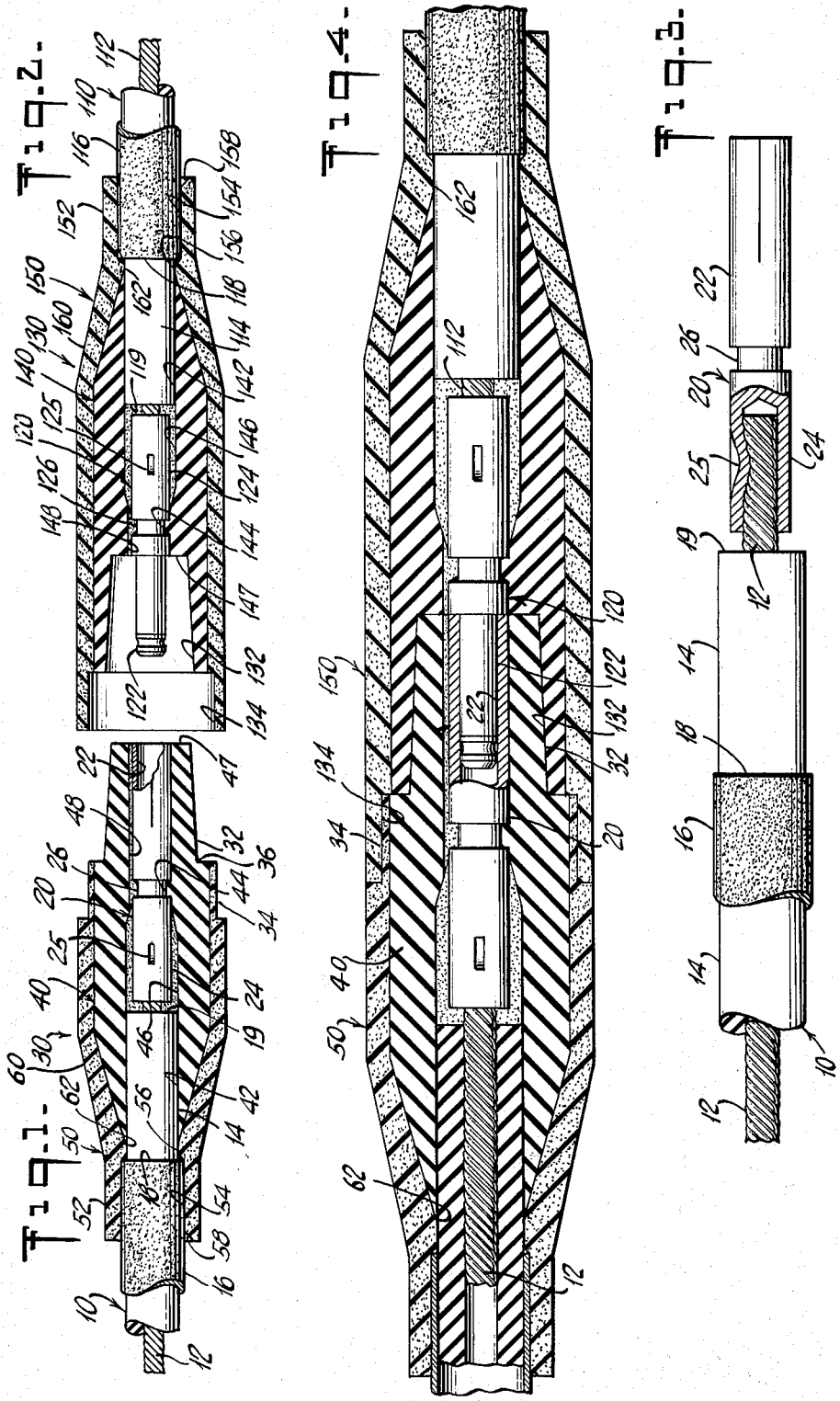

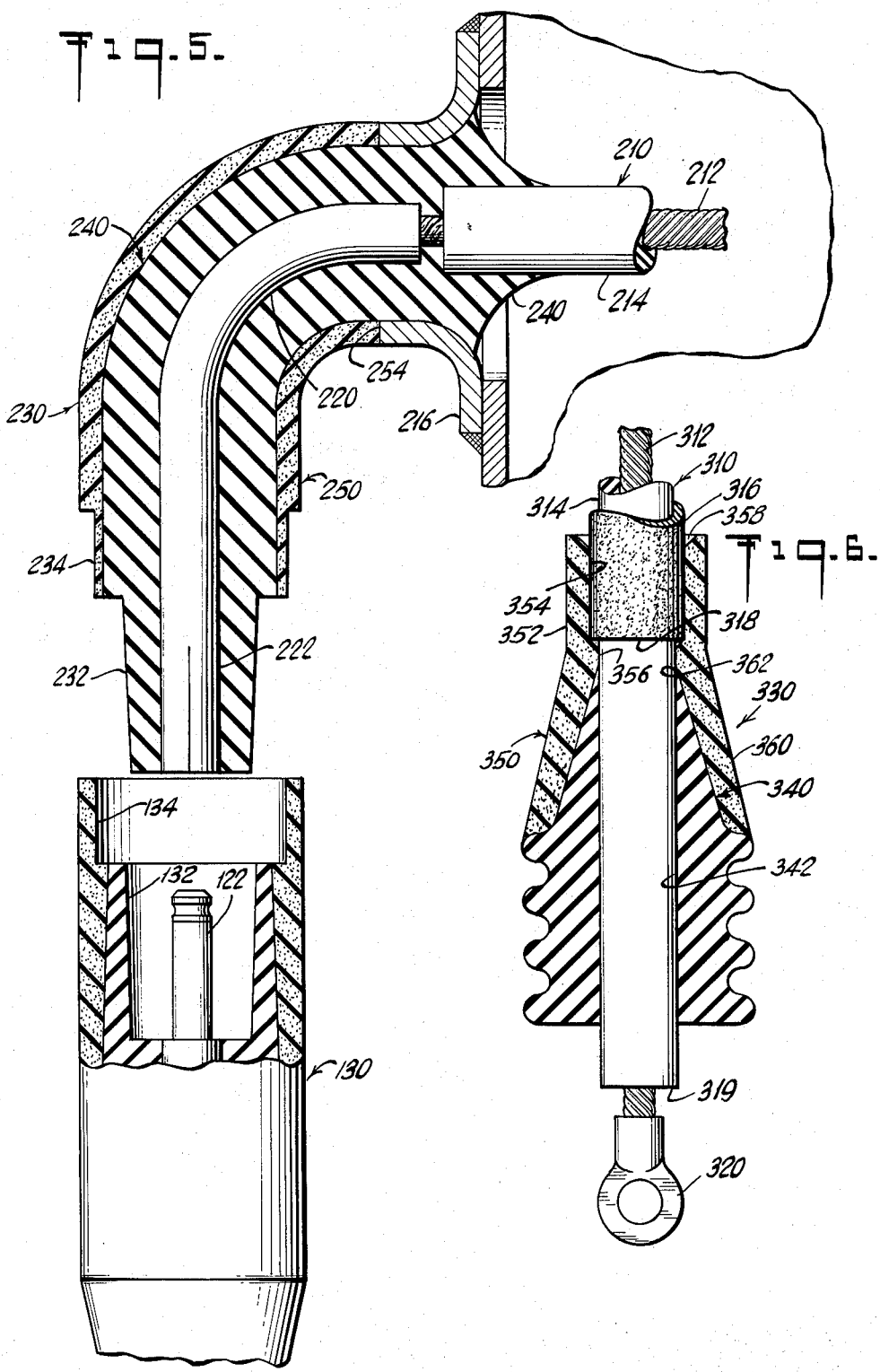

3,243,756
SHIELDED ELECTRICAL CONNECTION
Robert C. Ruete, Long Valley, and Robert R. Brown, Bernardsville, N.J., assignors to Elastic Stop Nut Corporation of America, Union, N.J., a corporation of New Jersey
Filed Apr. 9, 1963, Ser. No. 271,779
11 Claims. (Cl. 339—60)

The present invention relates generally to electrical connections and pertains more particularly to composite housings for terminating or connecting cables which utilize a shielding system comprised of an electrically conductive, generally metallic, sheath placed around the cable insulation.

Electrical connectors of many types have been developed for use with low-voltage cables which do not require a shielding system; however, terminatiton or connection of shielded high-voltage cables in the field heretofore has required intricate taping to assure adequate protection in the insulation of the conductor.

It is, therefore, an object of the invention to provide composite housings for terminating or connecting shielded cables which housings may be conveniently applied in the field.

Another object of the invention is to provide a composite housing for shielded cables in which sufficient dielectric strength is available to control the electrical stresses arising at the termination of a shielded cable.

A further object of the invention is to provide composite housings for shielded cables which provide a watertight seal between the cables and the housings.

A still further object of the invention is to provide composite housings for shielded cables which are economical to manufacture, easy to apply in the field and which utilize less than the conventional amount of space.

The invention may briefly be described as a composite housing for terminating or connecting shielded high voltage cables, the cables each having an electrical conductor, a covering of insulating material and a shield surrounding the covering, with a portion of the shield being removed to expose the covering the housing having an inner member of resilient insulating material with a portion for cooperating with the exposed covering to firmly grip the covering to increase the dielectric strength of the creep path along the covering, and an outer member of resilient electrically conductive material surrounding said inner member and having a portion for cooperating with the shield to attain an effective electrical connection therewith. The inner and outer members may each have a conical section along coresponding portions of their axial lengths to effect a gradual increase in the wall section of the inner member in a direction from the terminus of the shield toward the terminus of the covering. A plurality of such housings may be provided with portions for cooperating with the cables in watertight relation therewith and with corresponding portions for cooperating in watertight relation with one another to form an electrical connection between cables.

The novel features of the invention both as to its structure and method of operation, as well as additional objects and advantages thereof, will be more fully understood from the following description when read in connection with the accompanying drawings in which:

FIGURE 1 is a sectional view of a connector element constructed in accordance with the invention;

FIGURE 2 is a sectional view of another connector element constructed in accordance with the invention to complement the connector element of FIGURE 1;

FIGURE 3 is a side view of a shielded cable with an electrical contact secured thereto;

FIGURE 4 is a sectional view of the connector elements of FIGURES 1 and 2 engaged to form a detachable electrical connection;

FIGURE 5 is a sectional view of an electrical connector with one complementary element being formed as an integral part of a transformer housing; and FIGURE 6 is a sectional view of an insulating housing of the invention utilized for terminating the shielded portion of a high voltage cable.

Referring now to the drawings, and more particularly to FIGURE 1, an electrical connector constructed in accordance with the invention is shown applied at the terminus of a first shielded cable 10 which is comprised of an electrical conductor 12, which may be solid or stranded, an insulating covering 14 and an electrically conductive shield 16. The shield is terminated at 18 exposing a predetermined length of covering 14 and the covering is skived at 19 to expose a given length of conductor 12 (also see FIGURE 3). The conductor 12 is electrically connected to an electrical contact 20 which is provided with a socket 22 and a ferrule 24 (see FIGURE 3) which receives the exposed length of conductor 12, the conductor being mechanically secured to the socket 20 as by crimping the ferrule 24 at 25 in a well known manner. A grooved portion 26 lies between the socket 22 and the ferrule 24 for purposes which will be pointed out below.

In order to attain electrical continuity in the shield and provide adequate electrical insulation between the continued shield and the exposed conductor with the contact attached thereto, a composite housing 30 is applied to the terminus of cable 10 and is provided with external surfaces 32 and 34 having a male configuration which may be engaged with corresponding surfaces of a housing of a mating connector element as will be explained hereinafter, a shoulder 36 lying therebetween for purposes which will be explained later. Housing 30 has an inner sleeve 40 of resilient insulating material having an internal cylindrical surface provided with a larger-diameter portion 42 and a smaller-diameter portion 44.

The relative normal diameters of the internal surface portions 42 and 44 and the corresponding external surface portions of the covering 14 and the groove 26 of contact 20 are such that the latter may be inserted into the former by hand, the resilient property of the inner sleeve 40 permitting the sleeve to be radially expansible thereby allowing a slight dilation of the internal surface of the inner sleeve to admit the covering 14 and the contact 20. Thus, portion 42 firmly grips the exposed length of covering 14 in a tight fit, with portion 44 serving to locate and secure, or anchor, the contact 20 within the housing. The tight fit along the exposed length of covering increases the dielectric strength of the creep path along the covering between the exposed conductor and the shield to assure that current will not pass between the conductor and the shield along the covering. Lying between these first and second portions 42 and 44, is a chamber 46 which communicates with the outer end 47 of the inner sleeve 40 through a small passage 48, the chamber 46 being filled with an insulating jelly to protect the electrical connection at ferrule 24, the jelly being vented through passage 48 for purposes of assembling the housing and the cable in a manner which will be described more fully hereinafter.

In order to electrically continue the shield, an outer sleeve 50 of an electrically conductive resilient material surrounds the inner sleeve 40 and is contiguous therewith over the greatest portion of the length of the inner sleeve. Extending axially beyond the inner sleeve in the direction of the shield is a portion 52 of the outer sleeve having internal cylindrical surfaces 54 and 56. The relative normal diameters of the surfaces 54 and 56 and the corresponding external surfaces of the shield 16 and the covering 14 are such that the latter may be inserted into the former by hand, the resilient property of the outer sleeve 50 permitting the portion 52 to be radially expansible thereby allowing a slight dilation of the internal surfaces 54 and 56 to admit the shield 16 and establish a tight fit between the shield and surface 54 to attain an effective electrical connection between the shield and the outer sleeve, and a tight fit between the covering and surface 56. Additionally, the tight fit between the shield and surface 54, as well as the tight fit between the covering and surfaces 56 and 42 provide a watertight seal along these overlapping surfaces to prevent water from approaching the electrical connection at ferrule 24 along these surfaces. In order to facilitate the insertion, a small chamfer 58 is provided at the entrance to internal surfaces 54 and 56. Thus, the outer sleeve becomes, in effect, a shield for portions of the cable and the contact which extend beyond the terminus 18 of the shield 16.

It is important that adequate electrical insulation be provided between the shield and the conductor at all points along the housing, and it is the function of the inner sleeve to provide the necessary insulation. It is also necessary to assure that the transition from shield 16 to the shield provided by the outer sleeve 50 be accomplished without a deleterious concentration of electrical stresses along any portion of the housing 30. Hence, a smooth taper, or conical section, is provided at 60 in the housing to gradually effect the necessary increase in the wall section of the inner sleeve 40, and the corresponding increase in the internal diameter of the outer sleeve 50, from a point 62 near the terminus 18 of the shield 16 toward the terminus 19 of the covering 14. The diameters of surfaces 42 and 56 are identical so that the transition from the shielding outer sleeve 50 to the insulating inner sleeve 40 at point 62 is accomplished smoothly and without voids so as to preclude a build up of excessive electrical stress at the transition point.

Both the inner sleeve 40 and the outer sleeve 50 are preferably fabricated of an elastomeric material, the inner sleeve being an electrically insulating elastomer while the outer sleeve is an electrically conductive elastomer. In practice, the inner sleeve is molded first. Then the outer sleeve is molded around the inner sleeve to form a composite housing having contiguous sleeves joined in a single assembly, the juncture between the sleeves being continuous and void-free to enable the electrical stresses to be kept within control along the length of the housing. Preferably, the compounds of sleeves 40 and 50 are based on the same polymer to assure strong bonding. An ethylene-propylene terpolymer, available under Du Pont's trademark Nordel, is an example of a polymer which has been successfully used for this purpose. Insulating Nordel is used for sleeve 40 and conductive Nordel is used for sleeve 50.

In attaching a connector element of the invention to the terminus of a cable, the exposed end of the conductor is inserted into the ferrule of a contact and the contact is mechanically secured and electrically connected to the conductor by crimping the ferrule, as best seen at 25 in FIGURE 3. The contact and the attached cable are then inserted into the housing, chamber 46 of the housing having been previously filled with insulating jelly. As the contact and the covering displace the insulating jelly, the excess jelly is expelled through vent passage 48 assuring that the jelly remaining in chamber 46 contains no voids and completely fills the chamber to protect the connection at ferrule 24. When surface 54 firmly contacts the shield and portion 44 becomes seated in groove 26, the assembly is complete and the housing provides a shielded watertight insulated connector which may readily be installed in the field at the terminus of cable 10.

Turning now to FIGURE 2, an electrical connector element constructed in accordance with the invention and complementary to that illustrated in FIGURE 1 is shown attached at the terminus of a second shielded cable 110 which, like cable 10, is comprised of an electrical conductor 112, an insulating covering 114 and an electrically conductive shield 116, the shield being terminated at 118 and the covering terminated at 119. As explained in conjunction with the connector element of FIGURE 1, an electrical contact 120 is connected to the conductor, the contact 120 being provided with a plug 122, which is separably engagable with socket 22, a ferrule 124 (crimped at 125) and a grooved portion 126.

In order to attain electrical continuity in the shield and provide adequate electrical insulation between the continued shield and the exposed conductor with the contact attached thereto, a composite housing 130 is applied to cable 110 and is provided with internal surfaces 132 and 134 having a female configuration which may be engaged with corresponding external surfaces 32 and 34 on housing 30 as will be explained hereinafter.

As in housing 30, housing 130 has an inner sleeve 140 of resilient insulating material with internal cylindrical surface portions 142 and 144 for cooperating with the covering 114 and the groove 126 of contact 120, respectively, to grip the covering and locate and secure the contact within the housing 130 as explained hereinbefore, chamber 146 being filled with insulating jelly and being vented to face 147 of the inner sleeve 140 by means of passage 148. The shield 116 is continued by means of electrically conductive resilient outer sleeve 150 which surrounds inner sleeve 140 and is contiguous therewith over the length of the inner sleeve. Portion 152 extends axially so that cylindrical surfaces 154 and 156 will grip the shield 116 and the jacket 114, respectively, as explained in conjunction with housing 30, the hand insertion of contact 120, cable 110 and shield 116 into housing 130 being facilitated by a small chamfer 158 at the entrance to surfaces 154 and 156. As in housing 30, a smooth tapered portion, or conical section, is provided at 160 and provides an increase in the wall section of the inner sleeve 140 from point 162 toward the terminus of covering 114.

A detachable electrical connection between cables 10 and 110 may readily be effected in the field by the attachment of the connector elements illustrated in FIGURES 1 and 2, respectively, as explained hereinbefore, and then interfitting the connectors to form the connection shown in FIGURE 4. The electrical connection between conductors 12 and 112 is completed by virtue of plug 122 being received in socket 22 when the external diameters of the respective housings are grasped and the contacts pushed together into separable engagement. External male surface 32 is slightly tapered so as to readily be seated within internal female surface 132 when the contacts 20 and 120 are properly engaged, and to allow an increased thickness in the wall of insulating sleeve 40 at shoulder 36 without unnecessarily increasing the largest diameter of sleeve 40, the relative diameters of surfaces 32 and 132 being such that a tight fit is established therebetween for purposes which will be explained below.

In order to continue the shielding system completely across the connection, external male surface 34, formed in outer sleeve 50, is received within internal female surface 134, formed within outer sleeve 150. The relative normal diameters of the male surface 34 and the corresponding female surface 134 are such that the former may be inserted into the latter by hand, the resilient property of the outer sleeve 150 permitting the female surface 134 to be radially expansible thereby allowing a slight dilation of that surface to admit the male surface 34 and establish a tight fit between the male and female surfaces of the outer sleeves to attain an effective electrical connection between the outer sleeves so as to assure the electrical continuity of the shield system.

Additionally, the tight fit established between surfaces 34 and 134, as well as the tight fit established between surfaces 32 and 132, provides a watertight seal along these overlapping surfaces to protectively encase the electrical connections between the contacts within the interfitted housings. The connection may readily be detached by merely grasping the housings and pulling the connection apart.

For purposes of illustration, both the male and female connector elements of the connection shown in FIGURE 4 have been depicted as being assembled of a series of component parts; however, it will be apparent to those skilled in the art that either a male or a female connector element having the construction shown may be separably joined to a connector element having a complementary configuration, but having been integrally fixed to a cable or other structure at the factory. Thus, the invention provides male and female connector elements, either of which may be applied in the filed at any desired location in a cable to mate with any complementary connector element, or both of which may be applied in the field to enable, in either case, the fabrication of an efficient, readily disconnectable waterproof electrical connection at any desired location in a shielded cable without requiring tedious and time-consuming taping operations to gradually build up the required insulation between the shield and the attached conductors.

An example of such an application is illustrated in FIGURE 5 wherein a connector of the type illustrated in FIGURE 2 has been assembled at the end of a shielded cable in the field in order to enable the cable to be attached to a transformer lead 210 (which has an electrical conductor 212 with an insulating cover 214), a complementary connector having been formed integral with the transformer housing 216. The complementary connector has been formed with an electrical contact 220 fixed to the conductor 212 and having a socket 222 for receiving the complementary plug 122 of the assembled connector. A housing 230 has external male surface portions 232 and 234 for receiving complementary female surfaces 132 and 134 to form a watertight seal and electrical connections in a manner described above in conjunction with FIGURE 4. An inner sleeve 240 of resilient insulating material surrounds the contact 220 and serves to electrically isolate the contact from the outer sleeve 250 of electrically conductive resilient material which is electrically connected to the transformer housing 216 at 254. Thus, when the housing 130 is assembled with housing 230 the shielded cable is detachably connected to the transformer lead with the shield electrically connected to the transformer housing in a simple and effective manner.

The invention is successfully employed in terminating shielded high-voltage cables in a simple and effective manner without the attendant disadvantages of tedious taping operations to gradually build up the required amount of electrical insulation. Referring to FIGURE 6, cable 310 is shown terminated in such a manner, the cable having a conductor 312 with a covering of insulating material 314 which is surrounded by a shield 316, the shield being terminated at 318 to expose a predetermined length of covering and the covering being skived at 319 to expose a given length of conductor. An electrical terminal lug 320 is mechanically secured and electrically connected to the conductor in a conventional manner.

In order to control the electrical stresses arising at such a terminus by virtue of the removal of a portion of the shield, greater dielectric strength is required along the portion of the cable where the shield has been removed. In the past, control of such stresses has been established by the employment of a stress relief cone generally fabricated of multiple turns of tape insulation, with the portion of the cone adjacent to the shield being covered with a conductive material, usually in the form of tape, and connected to the shield to accomplish a smooth, gradual transition along the cable length.

In terminating a shielded cable in accordance with the invention, a housing 330 is provided with an inner sleeve 340 of a resilient insulating material having an internal surface 342 with a diameter somewhat less than the diameter of the cable covering 314 so that the covering may be slipped into the inner sleeve by hand and the internal surface 342 will grip the covering to increase the dielectric strength of the creep path along the covering and aid in maintaining the housing in place upon the cable. An outer sleeve 350 of electrically conductive material surrounds the inner sleeve 340 and is contiguous therewith along a substantial portion of the length of the inner sleeve and has a portion 352 extending axially from the inner sleeve, portion 352 having internal cylindrical surfaces 354 and 356.

The relative normal diameters of the surfaces 354 and 356 and the corresponding external surfaces of the shield 316 and the covering 314 are such that the latter may be inserted into the former by hand, the resilient property of the outer sleeve 350 permitting the portion 352 to be radially expansible thereby allowing a slight dilation of the internal surfaces 354 and 356 to admit the shield 316 and establish a tight fit between the shield and surface 354 and between the covering and surface 356, thus providing a watertight seal along these overlapping surfaces as well as attaining an effective electrical connection between the shield and the outer sleeve. In order to facilitate the insertion, a small chamfer 358 is provided at the entrance to internal surfaces 354 and 356.

In order to obtain the effect of a stress-relief cone as aforesaid, the housing 330 is provided with a smooth taper, or conical section, at 360 which accomplishes an increase in the wall section of the inner sleeve necessary to attain the required dielectric strength at the cable terminus, with the corresponding increase in the outer sleeve serving to achieve a smooth, gradual transition at point 362 from the shielded portion to the unshielded portion of the cable, the diameters of surfaces 342 and 356 being identical to assure a smooth, void-free transition.

As in the devices of FIGURES 1 through 5, the inner sleeve 340 is molded of an insulating elastomer while the outer sleeve 350 is molded of an electrically conductive elastomer. Hence, the invention has provided a simple and effective device for terminating a shielded high-voltage cable which utilizes the proven principle of the stress-relief cone without requiring tedious taping operations to gradually build up the cone.

It is to be understood that the above detailed description of preferred embodiments of the invention is provided by way of example only and is not intended to restrict the invention. Various details of design and construction may be modified without departing from the true spirit and scope of the invention as defined in the appended claims.

We claim:

1. An electrical connector having component parts capable of being assembled in the field at the terminus of shielded high voltage cables for providing a detachable electrical connection between first and second such cables, each cable having an electrical conductor, a covering of insulating material and an electrically conductive shield surrounding the covering with a portion of the shield removed to expose the covering, and a portion of the covering removed to expose the terminus of the conductor, said connector comprising:

(A) electrical contacts each capable of being mechanically secured and electrically connected to the exposed terminus of a conductor and of being detachably secured to one another to effect an electrical connection therebetween; and (B) composite housings for surrounding said contacts, each said housing having a portion for cooperating with a cable in watertight relation, said housings having corresponding portions for cooperating with one another in watertight relation, each said housing having (1) an inner member molded of resilient electrically insulating elastomeric material having a resiliently expansible portion of predetermined inside diameter for cooperating with the exposed covering to firmly grip the covering to increase the dielectric strength of the creep path along the covering, and a portion for cooperating with a corresponding portion of one of said contacts to anchor said contact within said inner member, and (2) an outer member of resilient electrically conductive elastomeric material molded around said inner member and having a first resiliently expansible portion of larger inside diameter than the resiliently expansible portion of said inner member for cooperating with the shield in effective electrical contact therewith and a second resiliently expansible portion between the resiliently expansible portion of said inner member and the first resiliently expansible portion of said second member for firmly gripping the insulating covering of the cable, said second resiliently expansible portion being joined to said first resiliently expansible portion by a shoulder adapted to abut the terminus of the cable shield and being of the same inside diameter as and forming a continuation of said resiliently expansible portion of said inner member, the outer member of each said housing having corresponding portions for cooperating with one another to attain an effective electrical connection therebetween when said housings and said contacts are in cooperative engagement, and said electrical connection between said contacts is protectively encased within said housings, said members being contiguous and joined in a single assembly and the juncture between said members being continuous and void free, and said resiliently expansible portions being dilatable by said cable without external constraint.

2. An electrical connector having component parts capable of being assembled in the field at the terminus of shielded high voltage cables for providing a detachable electrical connection between first and second such cables, each cable having an electrical conductor, a covering of insulating material and an electrically conductive shield surrounding the covering with a portion of the shield removed to expose the covering, and a portion of the covering removed to expose the terminus of the conductor, said connector comprising:

(A) first and second electrical contacts each having a ferrule to receive the exposed terminus of a conductor for mechanically securing and electrically connecting said contacts to the conductors, said contacts having interfitting portions for effecting a detachable electrical connection therebetween; and (B) first and second composite housings for surrounding said contacts, said first housing having a portion for engaging the first cable in watertight relation and said second housing having a portion for engaging the second cable in watertight relation, said first housing having a further portion for interfitting with a corresponding portion of said second housing in watertight relation therewith, each said housing having (1) an inner sleeve molded of electrically insulating elastomeric material having a resiliently dilatable portion with an internal diameter less than the external diameter of the exposed covering to firmly grip the covering to increase the dielectric strength of the creep path along the covering and a resiliently dilatable portion for firmly gripping a corresponding portion of one of said contacts to anchor said contact within said inner sleeve, and (2) an outer sleeve of electrically conductive elastomeric material molded around said inner sleeve and having a resiliently dilatable portion extending axially beyond said inner sleeve with an internal diameter less than the external diameter of the shield to grip the shield and attain an effective electrical connection therewith, said sleeves being contiguous and joined in a single assembly and the juncture between said sleeves being continuous and void free;

(C) the outer sleeve of each said housing having corresponding resiliently dilatable portions for interfitting to attain an effective electrical connection therebetween when said housings and said contacts are interfitted and the detachable electrical connection between said contacts is protectively encased within said interfitting housings.

3. An electrical connector of claim 2 wherein the juncture between said inner and outer sleeves has a conical section to effect a gradual increase in the wall section of the inner sleeve in a direction from the terminus of the shield toward the terminus of the covering.

4. Connector means for effecting a detachable electrical connection between a pair of shielded high voltage cables in the field, each cable having an electrical conductor, a covering of insulating material and an electrically conductive shield surrounding the covering, a portion of the shield being removed to expose the covering and a portion of the covering being removed to expose the conductor, said means comprising:

(A) a pair of metallic electrical contacts each having a ferrule at one end to receive one of the exposed conductors for mechanically and electrically connecting each said contact to a conductor, one said contact having a socket at the other end thereof and the other said contact having a plug at the other end thereof for detachably engaging said socket in an electrical connection; and (B) a pair of composite housings for surrounding said contacts and for engaging adjacent portions of the cables in watertight relation therewith, one said housing having at one end a female configuration and the other said housing having a male configuration at an opposed end for engaging said female configuration in watertight relation therewith, each said housing having (1) an inner sleeve molded of electrically insulating elastomeric material having a resiliently dilatable portion with an internal diameter less than the external diameter of the exposed covering for firmly gripping the covering to increase the dielectric strength of the creep path along the covering and a resiliently dilatable portion with an internal diameter less than the external diameter of a corresponding portion of one said contact for securing said contact within said inner sleeve, and (2) an outer sleeve of electrically conductive elastomeric material molded around said inner sleeve and having a resiliently dilatable portion extending axially beyond said inner sleeve with an internal diameter less than the external diameter of the shield for gripping the shield to attain an effective electrical connection therewith, said sleeves being contiguous and joined in a single assembly and the juncture between said sleeves being continuous and void free;

(C) one of said outer sleeves having a female portion and the other of said outer sleeves having a male portion for engaging said female portion in an effective, detachable electrical connection when said housings and said contacts are engaged and said detachable electrical connection between said contacts is protectively encased within said engaged housings.

5. Connector means of claim 4 wherein the juncture between said inner and outer sleeves has a conical section to effect a gradual increase in the wall section of the inner sleeve in a direction from the terminus of the shield toward the terminus of the covering.

6. A composite housing for terminating or connecting shielded high voltage cable having an electrical conductor, a covering of insulating material and an electrically conductive shield surrounding the covering, a portion of the shield being removed to expose the covering, said housing comprising:

(A) an inner member molded of electrically insulating elastomeric material having a resiliently expansible portion of predetermined inside diameter for cooperating with the exposed covering to firmly grip the covering to increase the dielectric strength of the creep path along the covering; and (B) an outer member of resilient electrically conductive elastomeric material formed around said inner member along at least a portion of the length of said inner member and having a first resiliently expansible portion of larger inside diameter than the resiliently expansible portion of said inner member for cooperating with the shield to attain an effective electrical connection therewith and a second resiliently expansible portion between the resiliently expansible portion of said inner member and the first resiliently expansible portion of said outer member for firmly gripping the insulating covering of the cable, said second resiliently expansible portion being joined to said first resiliently expansible portion by a shoulder adapted to abut the terminus of the cable shield and being of the same inside diameter as and forming a continuation of said resiliently expansible portion of said inner member; said members being contiguous and joined in a single assembly and the juncture between said members being continuous and void free, and said resiliently expansible portions being dilatable by said cable without external constraint.

7. A composite housing of claim 6 wherein the juncture between said inner and outer sleeves has a section effecting a gradual increase in the wall thickness of the inner sleeve in a direction away from the terminus of the shield toward the terminus of the covering.

8. A composite housing of claim 6 wherein a portion of said inner sleeve extends axially from said outer sleeve and is externally corrugated.

9. An electrical connector comprising a composite housing including an inner sleeve molded of electrically insulating elastomeric material and an outer sleeve of electrically conductive elastomeric material formed around said inner sleeve, said sleeves being contiguous and joined in a single assembly and the juncture between said sleeves being continuous and void free, said housing having a stepped waterseal surface adapted for telescopic engagement with a complementary waterseal surface, the first-mentioned waterseal surface having a longitudinally extending inner portion at one axial location and provided by said inner sleeve and a longitudinally extending outer portion at another axial location and provided by said outer sleeve.

10. An electrical connector of claim 9 wherein the inner and outer portions are joined by a transverse shoulder provided partly by said inner sleeve and partly by said outer sleeve.

11. A composite housing for terminating or connecting shielded high voltage cable having an electrical conductor and a covering of insulating material and electrically conductive material surrounding the covering, a portion of the covering being exposed, said housing comprising:

(A) an inner member molded of electrically insulating elastomeric material having a resiliently expansible portion of predetermined inside diameter for cooperating with the exposed covering to firmly grip the covering to increase the dielectric strength of the creep path along the covering; and (B) an outer member of resilient electrically conductive elastomeric material formed around said inner member along at least a portion of the length of said inner member and having a first resiliently expansible portion aligned with the resiliently expansible portion of said inner member for firmly gripping the electrically conductive material of the cable to attain an effective electrical connection therewith and a second resiliently expansible portion between the resilently expansible portion of said inner member and the first resiliently expansible portion of said outer member for firmly gripping the insulating covering of the cable, said second resiliently expansible portion being of the same inside diameter as and forming a continuation of said resiliently expansible portion of said inner member; said members being contiguous and joined in a single assembly and the juncture between said members being continuous and void free, and said resiliently expansible portions being dilatable without external constraint.

References Cited by the Examiner

UNITED STATES PATENTS

| | | | |
|---|---|---|---|
| 2,096,840 | 10/1937 | Bormann | 174—106 |
| 2,379,942 | 7/1945 | Webber | 339—60 |
| 2,460,304 | 2/1949 | McGee et al. | 339—60 |
| 2,762,025 | 9/1956 | Melcher | 339—143 |
| 2,925,459 | 2/1960 | Priaroggia | 174—73 |
| 3,018,318 | 1/1962 | Franklin | 174—73 |
| 3,148,011 | 9/1964 | Brown | 339—60 X |
| 3,166,371 | 1/1965 | Brown et al. | 339—60 |

PATRICK A. CLIFFORD, *Primary Examiner.*

ALFRED S. TRASK, *Examiner.*